US012783367B2

(12) United States Patent
Li et al.

(10) Patent No.: US 12,783,367 B2
(45) Date of Patent: Nov. 3, 2026

(54) MEMORY FAULT PROCESSING METHOD AND APPARATUS, AND STORAGE MEDIUM

(71) Applicant: xFusion Digital Technologies Co., Ltd, Zhengzhou City (CN)

(72) Inventors: Sheng Li, Zhengzhou (CN); Quanyang Bao, Zhengzhou (CN); Guangbiao Zhang, Zhengzhou (CN)

(73) Assignee: xFusion Digital Technologies Co., Ltd, Zhengzhou City (CN)

( * ) Notice: Subject to any disclaimer, the term of this patent is extended or adjusted under 35 U.S.C. 154(b) by 53 days.

(21) Appl. No.: 18/921,122

(22) Filed: Oct. 21, 2024

(65) Prior Publication Data

US 2025/0045176 A1 Feb. 6, 2025

Related U.S. Application Data

(63) Continuation of application No. PCT/CN2023/098290, filed on Jun. 5, 2023.

(30) Foreign Application Priority Data

Jul. 30, 2022 (CN) ........................ 202210911672.2

(51) Int. Cl.
*G06F 11/16* (2006.01)
*G06F 11/10* (2006.01)

(52) U.S. Cl.
CPC ...... *G06F 11/1658* (2013.01); *G06F 11/1016* (2013.01); *G06F 11/1064* (2013.01)

(58) Field of Classification Search
CPC ............. G06F 11/1658; G06F 11/1016; G06F 11/1064; G06F 11/073; G06F 11/076;
(Continued)

(56) References Cited

U.S. PATENT DOCUMENTS 6,408,401 B1 * 6/2002 Bhavsar ............... G11C 29/006 714/6.32
6,594,785 B1 * 7/2003 Gilbertson .......... G06F 11/0712 714/48

(Continued)

FOREIGN PATENT DOCUMENTS

CN 112667422 A 4/2021
CN 114064333 A 2/2022

(Continued)

OTHER PUBLICATIONS

Du et al., "DPCLS: Improving Partial Cache Line Sparing with Dynamics for Memory Error Prevention", 2020 IEEE 38th International Conference on Computer Design (ICCD) (Year: 2020).*

(Continued)

*Primary Examiner* — Mark D Featherstone
*Assistant Examiner* — Rong Tang
(74) *Attorney, Agent, or Firm* — Rimon PC

(57) ABSTRACT

This application discloses a memory fault processing method and apparatus, and a storage medium, to improve memory fault repair efficiency. An out-of-band controller obtains fault information of a memory. The out-of-band controller determines a fault severity of a target cache block based on the fault information and a target replacement cache block based on the fault severity of the target cache block. The target replacement cache block is used to replace the target cache block, the target replacement cache block is a cache block currently used to replace a historically faulty cache block. The out-of-band controller sends a repair request to a central processing unit (CPU), where the repair request is used to request the CPU to perform fault repair on the target cache block.

20 Claims, 6 Drawing Sheets

(58) Field of Classification Search
CPC ............... G06F 11/079; G06F 11/0793; G06F 12/0802; G11C 29/4401; G11C 29/70
See application file for complete search history.

(56) References Cited

U.S. PATENT DOCUMENTS

| | | | | |
|---|---|---|---|---|
| 2006/0080572 | A1 | 4/2006 | Fong | |
| 2021/0286667 | A1 * | 9/2021 | Yigzaw | G06F 11/0772 |

FOREIGN PATENT DOCUMENTS

| | | | |
|---|---|---|---|
| CN | 115421946 | A | 12/2022 |
| CN | 115421947 | A | 12/2022 |
| JP | 2004062377 | A | 2/2004 |
| WO | 2022028209 | A1 | 2/2022 |

OTHER PUBLICATIONS

Jiang et al., "LIRS: An efficient low inter-reference recency set replacement policy to improve buffer cache performance," in Proceedings of the 2002 ACM SIGMETRICS International Conference on Measurement and Modeling of Computer Systems, ser. SIGMETRICS'02, 2002, pp. 31-42 (Year: 2002).*

* cited by examiner

MEMORY FAULT PROCESSING METHOD AND APPARATUS, AND STORAGE MEDIUM

CROSS-REFERENCE TO RELATED APPLICATIONS

This application is a continuation n of International Application No. PCT/CN2023/098290, filed on Jun. 5, 2023, which claims priority to Chinese Patent Application No. 202210911672.2, filed on Jul. 30, 2022, both of which are hereby incorporated by reference in their entireties.

TECHNICAL FIELD

This application relates to the field of memory technologies, and in particular, to a memory fault processing method and apparatus, and a storage medium.

BACKGROUND

As an important storage module in a computer device, memory is used by the computer device to obtain or store related data. If the memory in a computer device is faulty, the operation of the entire computer device is greatly affected. Currently, to repair a faulty cache block in the memory, the faulty cache block is replaced with a replacement cache block. The technology is referred to as partial cache line sparing (PCLS) technology. However, due to the high costs of memories, replacement cache blocks are limited in quantity. Therefore, how to efficiently repair a fault in a memory by using limited replacement cache blocks is a problem urgently to be resolved currently.

SUMMARY

Embodiments of this application provide a memory fault processing method and apparatus, and a storage medium, to improve memory fault repair efficiency.

To achieve the foregoing objective, the following technical solutions are used in the embodiments of this application.

According to a first aspect, a memory fault processing method is provided, where the method includes: obtaining, by an out-of-band controller, fault information of a memory, where the fault information indicates that at least one cache block is faulty; determining, by the out-of-band controller, a fault severity of a target cache block based on the fault information, where the target cache block is one of the at least one cache block; determining, by the out-of-band controller, a target replacement cache block based on the fault severity of the target cache block, where the target replacement cache block is used to replace the target cache block, the target replacement cache block is a cache block currently used to replace a historically faulty cache block, and the fault severity of the target cache block is greater than or equal to a fault severity of the historically faulty cache block; and sending, by the out-of-band controller, a repair request to a central processing unit CPU, where the repair request is used to request the CPU to perform fault repair on the target cache block, and the repair request carries mark information of the target replacement cache block.

Currently, when a PCLS technology is used to repair a memory fault, a quantity of replacement cache blocks is limited. Therefore, in this application, it is proposed that a repair policy is determined based on the fault severity of the target cache block. When limited replacement cache blocks are occupied by the historically faulty cache block, a repair resource that is in the historically faulty cache block but has a fault severity less than the fault severity of the target cache block is used to repair the target cache block, thereby reusing limited repair resources to repair a fault that is more likely to affect a system, and improving memory fault repair efficiency.

In a possible implementation, the determining, by the out-of-band controller, a fault severity of a target cache block based on the fault information includes: counting a fault occurrence quantity of the target cache block within a preset time period, where the fault occurrence quantity is used to represent the fault severity of the target cache block, and the preset time period is a time period from the startup of a server in which the memory is located to a current moment.

In this possible implementation, a specific implementation of obtaining the fault severity of the target cache block is provided. The fault occurrence quantity of the target cache block within the preset time period is counted, and the fault severity of the target cache block is represented based on the fault occurrence quantity, thereby helping evaluate each faulty cache block, so as to determine a cache block with a relatively high possibility of affecting the system.

In a possible implementation, the determining, by the out-of-band controller, a fault severity of a target cache block based on the fault information includes: inputting fault information of the target cache block into a fault model, and outputting by the fault model the fault severity of the target cache block, where the fault information includes at least one of location information, a fault occurrence time, or a fault occurrence quantity.

In this possible implementation, a specific implementation of obtaining the fault severity of the target cache block is provided. The fault model outputs a fault severity of a faulty cache block based on fault information, thereby helping prevent a user from participating in calculation and data processing, avoiding a user error caused by a user operation, and improving accuracy of a fault prediction result.

In a possible implementation, the fault information includes information about a location at which the at least one cache block is faulty, and before the determining, by the out-of-band controller, a fault severity of a target cache block based on the fault information, the method further includes: determining a fault type of the at least one cache block based on the information about the location at which the at least one cache block is faulty; and determining that a cache block whose fault type is a single-point fault is the target cache block, where a row address of the target cache block is different from a row address of another faulty cache block, and a column address of the target cache block is different from a column address of the another faulty cache block.

In this possible implementation, a specific implementation of determining the target cache block is provided. Whether a fault type of a cache block is a single-point fault is determined to determine whether it is the target cache block, that is, a replacement cache block may be used to perform fault repair on a cache block whose fault type is a single-point fault.

In a possible implementation, the target replacement cache block is a cache block that is currently used to replace a historically faulty cache block with a lowest fault severity.

In this possible implementation, a replacement cache block corresponding to the historically faulty cache block with the lowest fault severity is determined as the target replacement cache block, to help use the replacement cache block to repair a fault with a relatively high fault severity, thereby reducing a risk that the fault with the relatively high fault severity affects the system.

In a possible implementation, the method further includes: receiving a fault repair result that is of the target cache block and that is sent by the CPU; when the fault repair result indicates a repair success, storing, by the out-of-band controller, a correspondence between the target cache block and a replacement cache block that replaces the target cache block; and when the fault repair result carries the mark information of the target replacement cache block, and indicates a repair success, updating, by the out-of-band controller, a correspondence between the target replacement cache block and the historically faulty cache block to a correspondence between the target replacement cache block and the target cache block.

In this possible implementation, a correspondence between a faulty cache block and a repair resource is updated by receiving the fault repair result fed back by the CPU. This helps determine, based on the fault repair result, whether the target cache block occupies limited replacement cache blocks. In this way, when a fault occurs next time, the fault severities of a next faulty cache block and the target cache block are determined, to determine a target replacement cache block for the next faulty cache block.

According to a second aspect, a memory fault processing apparatus is provided, including functional units configured to perform any method provided in the first aspect, where actions performed by each functional unit are implemented by using hardware or by executing corresponding software by hardware. For example, the apparatus may include an obtaining unit, a processing unit, and a sending unit. The obtaining unit is configured to obtain fault information of a memory, where the fault information indicates that at least one cache block is faulty. The processing unit is configured to determine a fault severity of a target cache block based on the fault information, where the target cache block is one of the at least one cache block. The processing unit is further configured to determine a target replacement cache block based on the fault severity of the target cache block, where the target replacement cache block is used to replace the target cache block, the target replacement cache block is a cache block that currently replaces a historically faulty cache block, and the fault severity of the target cache block is greater than or equal to a fault severity of the historically faulty cache block. The sending unit is configured to send a repair request to a CPU, where the repair request is used to request the CPU to perform fault repair on the target cache block, and the repair request carries mark information of the target replacement cache block.

According to a third aspect, a computer device is provided, including a processor and a storage. The processor is connected to the storage, the storage is configured to store computer execution instructions, and the processor executes the computer execution instructions stored in the storage, to implement any method provided in the first aspect.

According to a fourth aspect, a chip is provided, where the chip includes a processor and an interface circuit, the interface circuit is configured to receive a code instruction and transmit the code instruction to the processor, and the processor is configured to run the code instruction to perform any method provided in the first aspect.

According to a fifth aspect, a computer-readable storage medium is provided, including computer execution instructions, where when the computer execution instructions are run on a computer, the computer is enabled to perform any method provided in the first aspect.

According to a sixth aspect, a computer program product is provided, including computer execution instructions, where when the computer execution instructions are run on a computer, the computer is enabled to perform any method provided in the first aspect.

For technical effects brought by any implementation of the second aspect to the sixth aspect, refer to technical effects brought by corresponding implementations of the first aspect. Details are not described herein again.

DESCRIPTION OF EMBODIMENTS

In descriptions of this application, unless otherwise stated, "/" means "or", for example, A/B may represent A or B. In this specification, "and/or" merely describes an association relationship between associated objects, and indicates that three relationships may exist, for example, A and/or B may indicate three cases: Only A exists, both A and B exist, and only B exists. In addition, "at least one" means one or more, and "a plurality of" means two or more. Terms such as "first" and "second" do not limit a quantity or an execution sequence, and terms such as "first" and "second" do not mean being definitely different.

It should be noted that words such as "example" or "for example" in this application are used to represent examples, illustrations, or descriptions. Any embodiment or design solution described as "example" or "for example" in this application should not be construed as being more preferred or advantageous than other embodiments or design solutions. Use of the words such as "example" or "for example" is intended to present relevant concepts in a specific manner.

Figure 1:
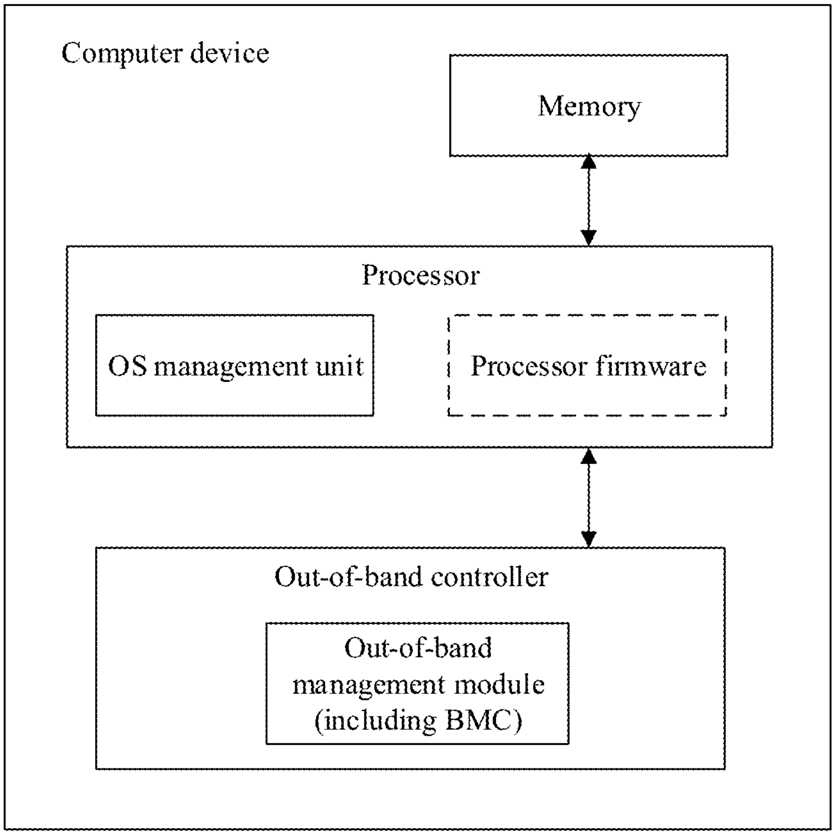
FIG. 1 is a schematic diagram of composition of a computer device according to an embodiment of this application.

FIG. 1 is a diagram of a system architecture according to an embodiment of this application. The diagram of the system architecture is an architectural diagram of a computer device. In referring to FIG. 1, a hardware part of the computer device includes a processor, an out-of-band controller, and a memory, and a software part thereof mainly includes an out-of-band management module, processor firmware, and an operating system (OS) management unit. The out-of-band management module is located in the out-of-band controller, the OS management unit is located in the processor, and the processor firmware may be located in the processor (as shown in FIG. 1), or the processor firmware may be located in a firmware chip (not shown in FIG. 1) outside the processor. The out-of-band management module may be a management unit of a non-service module. For example, the out-of-band management module may perform remote maintenance and management on a server by using a dedicated data channel. The out-of-band management module is totally independent of an operating system of the server, and may communicate with a basic input output system (BIOS) and an OS (or an OS management unit) by using an out-of-band management interface of the server.

For example, the out-of-band management module may include a management unit of a running state of the computer device, a management system in a management chip outside the processor, a baseboard management controller (BMC) of the computer device, a system management mode (SMM), or the like. It should be noted that a specific form of the out-of-band management module is not limited in embodiments of this application, and the foregoing description is merely example description. In the following embodiments, only an example in which the out-of-band management module is a BMC is used for description.

The processor firmware may also be referred to as a processor firmware program. Specifically, the processor firmware includes firmware such as Firmware, a basic input output system (BIOS), a management engine (ME), microcode, or an intelligent management unit (IMU). It should be noted that a specific form of the processor firmware is not limited in this embodiment of this application, and the foregoing is merely example description. In the following embodiments, only an example in which the processor firmware is a BIOS is used for description.

It should be noted that some management units or modules and firmware that are included in the out-of-band management module and the processor firmware are merely examples. In fact, some management units may also run on a computer as processor firmware programs, for example, the SMM may also provide a service for a user, to perform a BIOS-related function. Similarly, some processor firmware may also be used as a management unit of a non-service module, for example, an ME and an IMU, etc., to perform BMC-related functions.

The memory is also referred to as an internal memory or a main memory, and is mounted in a memory slot on a mainboard of the computer device. The memory communicates with a memory controller by using a memory channel. The memory has at least one memory rank, each memory rank is located on one side of the memory, each memory rank includes at least one memory subrank, the memory rank or the memory subrank includes a plurality of memory devices, each memory device is divided into a plurality of memory bank groups, each memory bank group includes a plurality of memory banks, each memory bank is divided into a plurality of memory cells, each memory cell has one row address and one column address, and each memory cell includes one or more bits. That is, one memory cell may be located in a memory bank, provided that a row and a column in the memory bank are specified. A minimum unit in which a memory fault occurs is a memory cell in a memory bank.

In this embodiment of this application, the memory cell may be referred to as a cache block. When the cache block occupies 4 bits, the memory cell may be referred to as a nibble entry. When the cache block occupies 8 bits, the memory cell may be referred to as a byte entry. The row address and the column address of the memory cell are used to indicate a location of the memory cell in the memory. In a division manner, the memory may be successively divided from a higher level to a lower level into a memory device, a memory bank group, a memory bank, a memory row/a memory column, a memory cell (cache block), and a bit, where addresses, on the memory, of a memory device, the memory bank group, the memory bank, the memory row, the memory column, the memory cell (cache block), and the bit are real physical addresses. In another division manner, a central processing unit (CPU) divides the memory device into a plurality of memory pages based on a paging mechanism, the address of the memory page is a virtual address, and the virtual address needs to be translated before becoming a real physical address.

It should be noted that the system architecture and the application scenario described in the embodiments of this application are intended to describe the technical solutions in the embodiments of this application more clearly, but are not intended to limit the technical solutions provided in the embodiments of this application. A person of ordinary skill in the art may know that, as the system architecture evolves and a new service scenario emerges, the technical solutions provided in the embodiments of this application are also applicable to a similar technical problem.

The method provided in the embodiments of this application may be applicable but is not limited to a memory such as a dynamic random access memory (DRAM) or a static random access memory (SRAM). The method in the embodiments of this application sets no limitation on a type of the memory.

Currently, processors of most computer devices support checking a memory, and correcting a detected error, that is, repairing a fault in the memory. For example, each time the memory performs a read/write task, the processor identifies and repairs a fault in the memory by using an error checking and correction (ECC) method. The ECC method is used to identify an error existing when a relatively small quantity of bits in the memory fail. An error that can be corrected is referred to as a correctable error (CE), and may also be referred to as a correctable fault. If a capability of an error correction algorithm is exceeded, for example, when a wide range of a plurality of bits in the memory fail, error correction fails, and an uncorrectable error (UCE) is generated, where the uncorrectable error may also be referred to as an uncorrectable fault. When UCE generates, it will cause a serious failure of the computer device system, such as downtime, resulting in the loss of data in the memory.

To repair a faulty cache block in the memory, the embodiments of this application provide a technology for repairing a memory fault by replacing a faulty cache block with a replacement cache block. The technology is referred to as a PCLS technology. When the cache block is a nibble entry, the replacement cache block may be referred to as a nibble replacement entry. The replacement cache block is generally stored in a memory controller. Due to the costs of the memory controller, a quantity of replacement cache blocks is limited. For example, each memory channel has 16 replacement cache blocks. Therefore, how to efficiently repair a memory fault by using limited replacement cache blocks is a problem urgently needed to be resolved currently. It should be noted that a quantity of replacement cache blocks in the memory controller is not limited in the embodiments of this application, and the foregoing description is merely example description.

Figure 2:
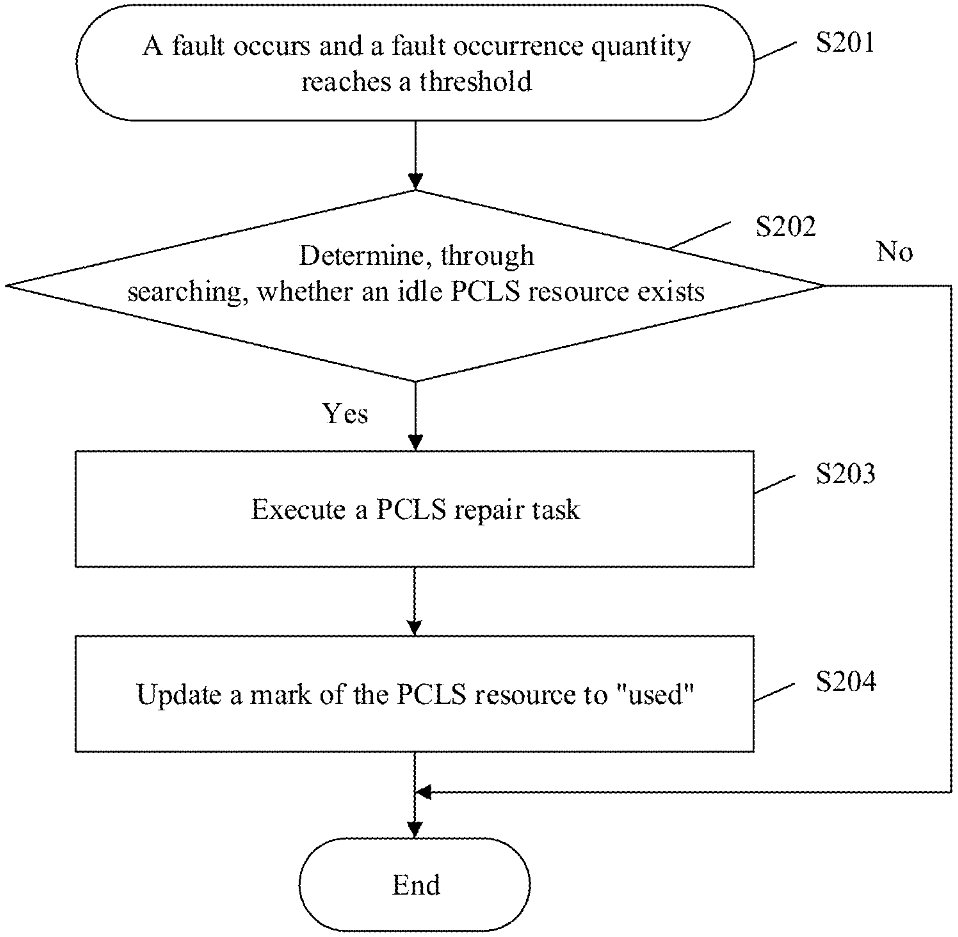
FIG. 2 is a schematic flowchart of a memory fault repair method.

In some embodiments, as shown in FIG. 2, a memory fault is repaired by using the PCLS technology based on the following steps S201 to S204.

S201: Trigger a fault repair procedure when a fault occurs and a fault occurrence quantity reaches a threshold.

S202: Search whether an idle PCLS resource exists.

It may be understood that a PCLS resource is the foregoing replacement cache block. An idle PCLS resource is a cache block that is not used to repair a fault.

S203: If an idle PCLS resource exists, execute a PCLS repair task.

Specifically, a faulty cache block is replaced with the idle PCLS resource.

If no idle PCLS resource exists, the PCLS repair task is not executed.

It may be understood that, when there is no idle PCLS resource to replace the faulty cache block, the faulty cache block cannot be repaired, and the faulty cache block may affect the system.

S204: Update a mark of the PCLS resource to "used".

The mark of the PCLS resource is used to indicate whether the resource has been used to repair a faulty cache block.

The foregoing steps S201 to S204 describe a basic solution for repairing a memory fault by using the PCLS technology. However, PCLS resources are generally limited. In the foregoing solution, after all PCLS resources are used, a subsequently faulty cache block cannot be repaired. It is clear that the foregoing manner is not conducive to proper utilization of a repair resource.

Figure 3:
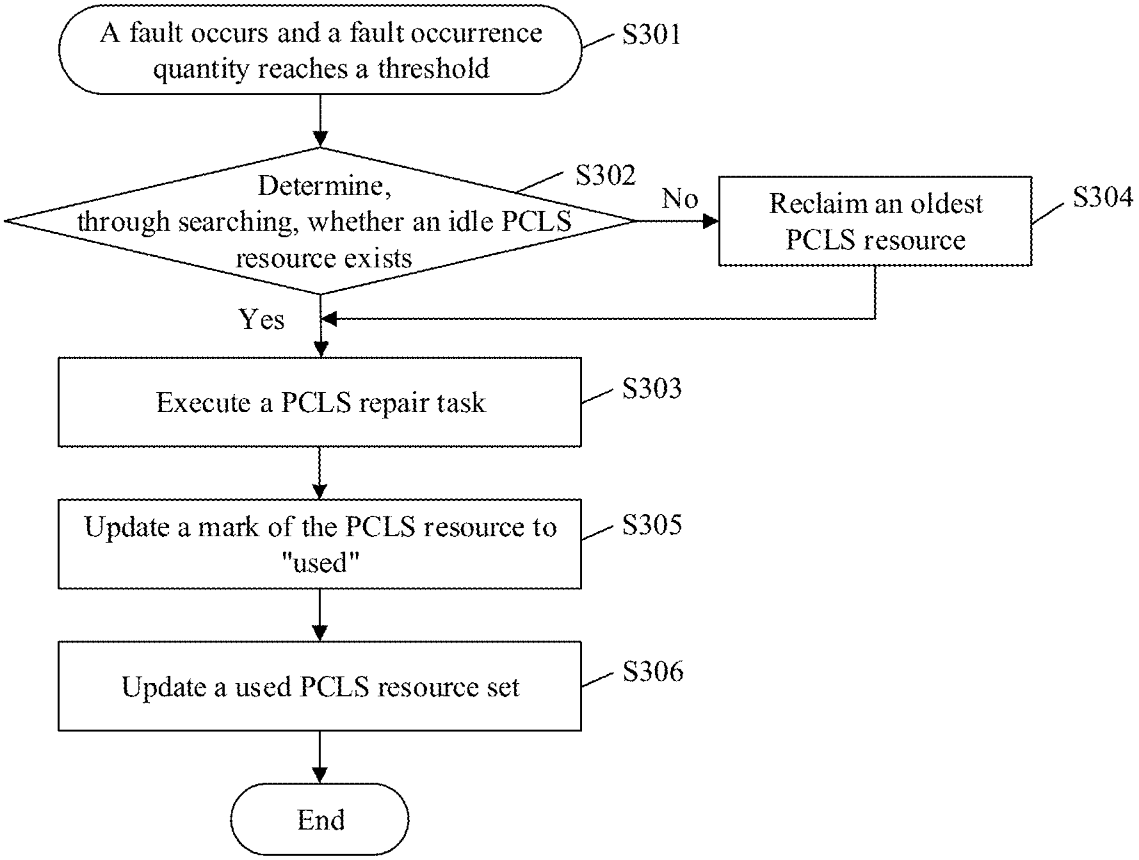
FIG. 3 is a schematic flowchart of a memory fault repair method.

In some other embodiments, as shown in FIG. 3, a memory fault is repaired by using the PCLS technology based on the following steps S301 to S306.

S301: Trigger a fault repair procedure when a fault occurs and a fault occurrence quantity reaches a threshold.

S302: Search whether an idle PCLS resource exists.

S303: If an idle PCLS resource exists, execute a PCLS repair task.

S304: If no idle PCLS resource exists, reclaim an oldest PCLS resource, and then execute a PCLS repair task.

The oldest PCLS resource is a cache block that is the first used to repair faults among the occupied repair resources. For example, if replacement cache blocks a, b, and c are respectively used to repair a fault based on a time sequence, the replacement cache block a is the oldest PCLS resource.

In the foregoing step S304, the reclaimed oldest PCLS resource is used to replace a currently faulty cache block.

S305: Update a mark of the PCLS resource to "used".

S306: Update the used PCLS resource set.

It may be understood that the used PCLS resource set includes a plurality of replacement cache blocks, and the plurality of replacement cache blocks respectively correspond to the time of use, or the plurality of replacement cache blocks are arranged based on a sequence of the time of use. When another cache block in the memory is subsequently faulty, a repair resource is reclaimed from the used PCLS resource set.

The foregoing steps S301 to S306 describe a solution of reclaiming the PCLS resource by using the PCLS technology to repair a memory fault. However, in this solution, a policy of reclaiming the PCLS resource is determined based on a time sequence in which the PCLS resource is used, and a manner in which a cache block that is first used to repair a fault is used to repair a currently faulty cache block is also not conducive to proper utilization of a repair resource.

In view of the drawbacks, in the following examples, embodiments of this application provide a memory fault processing method. A fault severity of a target cache block is determined based on fault information, and an available repair resource is reclaimed for the target cache block from used repair resources by using the fault severity. This helps resolve a problem in the conventional technology that a PCLS resource cannot be reclaimed to repair a subsequently faulty cache block, and helps to improve the utilization of the PCLS resource, and prevent a cache block with a relatively high fault severity from affecting a system.

Figure 4:
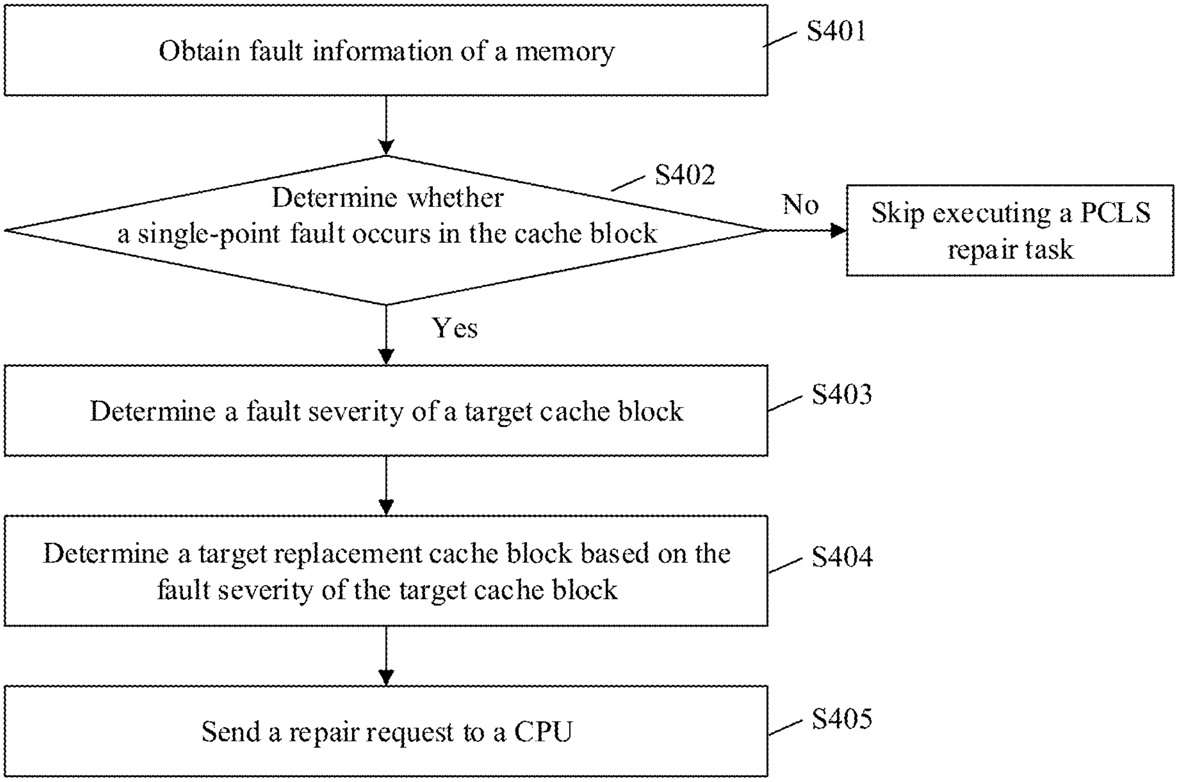
FIG. 4 is a schematic flowchart of a memory fault repair method according to an embodiment of this application.

FIG. 4 is a flowchart of a memory fault processing method according to an embodiment of this application. The method includes steps S401 to S404.

S401: An out-of-band controller obtains fault information of a memory.

The fault information indicates that at least one cache block is faulty. The fault information includes information about a location at which the cache block is faulty in the memory. For example, the foregoing fault information is used to indicate the address information of the memory cell in the memory.

Optionally, the fault information includes a fault occurrence time of the cache block. The fault occurrence time is used by the out-of-band controller to subsequently determine a fault occurrence frequency of the cache block within a preset time period. For example, when the fault occurrence time is within the preset time period, a fault that occurs in the cache block at the fault occurrence time is counted. When the fault occurrence time is not within the preset time period, the current fault is not counted.

It may be understood that the fault information is used to indicate basic information that a fault occurs, and the foregoing information included in the fault information is only an example, and the fault information may include more or less information. This is not limited in this application.

In the foregoing related technology, each time the memory executes a read/write task, a CPU performs fault detection on the memory based on an ECC method, and if a fault is detected, corrects the detected error. In some embodiments, when detecting a fault, the CPU sends fault information of a faulty cache block to the out-of-band controller. Alternatively, when detecting a fault, the CPU reports fault information of a faulty cache block to the processor firmware, and the processor firmware forwards the fault information to the out-of-band controller. In other words, a subject that sends the fault information to the out-of-band controller may be the CPU or the processor firmware. This is not limited in this embodiment of this application. In the following solutions, the CPU is used as an example for description.

In some embodiments, the out-of-band controller may periodically obtain the fault information of the memory. That the out-of-band controller periodically obtains the fault information of the memory may be that the out-of-band controller actively obtains the fault information from the CPU or the processor firmware, or may be that the CPU or the processor firmware actively sends the fault information to the out-of-band controller after periodically collecting the fault information of the memory.

S402: The out-of-band controller determines whether a fault type of the cache block is a single-point fault.

Optionally, the out-of-band controller determines, based on the information about the location at which the at least one cache block is faulty, whether a fault type of the cache block is a single-point fault. The out-of-band controller determines the fault type of the at least one cache block based on the information about the location at which the at least one cache block is faulty, and determines that a cache block whose fault type is a single-point fault as a target cache block.

Specifically, the out-of-band controller determines whether address information of the target cache block is different from address information of another faulty cache block, to determine whether a fault type of the target cache block is a single-point fault. The other faulty cache block includes the at least one cache block indicated by the fault information and a historically faulty cache block. The historically faulty cache block is a cache block that is faulty and repaired before the target cache block is faulty. The determining of whether address information of the target cache block is different from address information of another faulty cache block includes: determining whether a row address of the target cache block is different from a row address of the another faulty cache block, and determining whether a column address of the target cache block is different from a column address of the another faulty cache block. When the row address of the target cache block is different from the row address of the another faulty cache block, and the column address of the target cache block is different from the column address of the another faulty cache block, it is determined that a fault type of the target cache block is a single-point fault.

It may be understood that, when a plurality of (for example, two) faulty cache blocks appear in a same row or a same column in the memory, the out-of-band controller may diagnose, that the memory row or the memory column has a relatively high possibility of being faulty. In this case, fault repair needs to be performed on the memory row or the memory column by using another technology, instead of performing repair by replacing the faulty cache block with a replacement cache block by using the PCLS technology.

In some embodiments, when the CPU sends the fault information to the out-of-band controller, and an out-of-band management module determines, based on the fault information, that the fault type of the cache block is not a single-point fault, the out-of-band management module may return the fault information of the cache block to the CPU. Alternatively, the out-of-band controller feeds back information to the CPU, the information indicating that the fault type of the cache block is not a single-point fault, so that the CPU changes a repair manner of the target cache block in another manner.

Specifically, when the out-of-band controller determines that a fault type of the cache block is a single-point fault, the cache block is a target cache block. The out-of-band controller determines to repair the target cache block based on the PCLS technology, and performs the following step S403.

The foregoing step S402 is an optional step.

S403: The out-of-band controller determines a fault severity of the target cache block.

Optionally, the fault severity of the target cache block is used to indicate a probability that the fault of the target cache block has changed to a UCE.

In an example, the out-of-band controller may determine the fault severity of the target cache block by counting a fault occurrence quantity of the target cache block. The fault occurrence quantity is used to represent the fault severity of the target cache block.

It may be understood that, generally, the target cache block is repaired in the memory. If the repair succeeds, the fault is marked as a CE. Subsequently, if the cache block is repeatedly faulty and has been repaired a plurality of times, to prevent the fault of the cache block from changing from a CE to a UCE, in the memory, the faulty cache block may be replaced with a replacement cache block by using the PCLS technology, to resolve a problem that the cache block is repeatedly faulty.

Optionally, the out-of-band controller counts a fault occurrence quantity within a preset time period based on a fault occurrence time of the target cache block. Further, the out-of-band controller determines a fault occurrence frequency of the target cache block based on the fault occurrence quantity within the preset time period. The fault occurrence frequency is calculated, to help determine a fault with a relatively high occurrence frequency within the preset time period, where a fault severity of the fault within the preset time period is relatively high. For example, the preset time period is a time period from the startup of a server in which the memory is located, to a time at which the fault information is obtained.

In an example, the out-of-band controller inputs fault information of the target cache block into a fault model, and outputs the fault severity of the target cache block. The fault information includes one or more of location information, fault occurrence time, and fault occurrence quantity.

The fault model is a pre-trained machine learning model, and a training process of the fault model may be performing iterative training by using a training sample and a sample label, where the training sample includes the fault information of a plurality of memories, and the sample label includes a fault severity of each training sample. The fault training model may be an artificial intelligence (AI) fault training model.

In some embodiments, because the fault model is pre-trained, a fault severity of a target memory can be obtained by inputting fault information of the target memory into the fault model, and a user does not need to participate in calculation and data processing. This not only helps improve a fault prediction speed, but also avoids a manual error caused by a user operation, thereby improving accuracy of a fault prediction result.

In some embodiments, the machine learning model may be a hierarchical threshold algorithm, or one or more of machine learning algorithms such as a random forest, a gradient boosting decision tree (GBDT), extreme gradient boosting (XGBoost), naive Bayes, and a support vector machine (SVM), or one or more of deep learning algorithms such as a convolutional neural network (CNN) and a long short-term memory (LSTM), or one or more of federated learning optimization algorithms such as federated averaging (FedAvg), FedProx, and FedCS.

S404: The out-of-band controller determines a target replacement cache block based on the fault severity of the target cache block.

The target replacement cache block is used to replace the target cache block, and the target replacement cache block is a cache block that currently replaces the historically faulty cache block. The fault severity of the target cache block is greater than or equal to a fault severity of the historically faulty cache block.

It may be understood that the foregoing step S403 is used to determine a fault severity of a faulty cache block before a fault is repaired by using the PCLS technology. Therefore, the fault severity of the target cache block is compared with the fault severity of the historically faulty cache block. If a historically faulty cache block corresponding to a fault severity less than the fault severity of the target cache block exists, the replacement cache block used to repair a historically faulty cache block with a relatively low fault severity may be reclaimed, and the target replacement cache block is determined to replace the target cache block. There may be a plurality of historically faulty cache blocks whose fault severities are less than the fault severity of the target cache block, and correspondingly, there may also be a plurality of reclaimable repair resources.

In an example, the out-of-band controller determines a priority sequence based on the fault severity of the historically faulty cache block, where a priority corresponding to a historically faulty cache block with a high fault severity is high, and a priority corresponding to a historically faulty cache block with a low fault severity is low. Further, the out-of-band controller compares the fault severity of the target cache block with the priority sequence, and determines a location of the target cache block in the priority sequence based on the fault severity of the target cache block. If the priority of the target cache block is relatively high, it indicates that the target cache block has a relatively high possibility of affecting the system. If a priority of the target cache block is low, it indicates that the target cache block has a relatively low possibility of affecting the system.

It may be understood that a quantity of replacement cache blocks is limited currently. The fault severity of the target cache block is compared with the fault severity of the historically faulty cache block, to help flexibly schedule the limited replacement cache blocks to repair a cache block with a relatively high fault severity, thereby preventing the cache block from affecting the system as much as possible.

In an example, the out-of-band controller determines, based on the fault severity of the target cache block, one or more historically faulty cache blocks whose priorities are less than the priority of the target cache block, and further determines replacement cache blocks used by the one or more historically faulty cache blocks. The out-of-band controller determines the target replacement cache block from the replacement cache blocks used by the one or more historically faulty cache blocks, and the target replacement cache block is used to repair the target cache block when no idle replacement cache block exists.

In an example, the out-of-band controller determines a historically faulty cache block with a lowest fault severity from the one or more historically faulty cache blocks, and uses, as the target replacement cache block, a replacement cache block used by the historically faulty cache block.

It may be understood that, for the target cache block, the out-of-band controller determines the priority sequence by evaluating the fault severity of the target cache block and the fault severity of the historically faulty cache block. If the fault severity of the target cache block is higher, and all replacement cache blocks have been used to repair a fault of the historically faulty cache block, the out-of-band controller reclaims a replacement cache block corresponding to a historically faulty cache block with a lowest fault severity in the priority sequence, and uses the reclaimed replacement cache block as the target replacement cache block. When no idle replacement cache block exists in a repair process, the target replacement cache block is used to repair the target cache block.

In an example, the out-of-band controller determines a reclaimable identifier for the reclaimed replacement cache block, and the reclaimable identifier is used to indicate that the replacement cache block is the target replacement cache block. Specifically, reclaimable identifiers include reclaimable and non-reclaimable identifiers, for example, 0 and 1 respectively represent reclaimable and non-reclaimable identifiers. Alternatively, the out-of-band controller determines a reclaimable identifier range, and the range is used to indicate a quantity of replacement cache blocks in a repair resource. For example, if the quantity of replacement cache blocks is 16, the reclaimable identifier range is 0 to 15. When a plurality of reclaimable repair resources exist, it is determined, in ascending order of fault severities corresponding to the plurality of reclaimable repair resources, that reclaimable identifiers are respectively 0, 1, . . . , n, n≤15.

Through the foregoing manner of determining an available resource for the target cache block from the replacement cache block used by the historically faulty cache block, it is helpful to repair a faulty cache block based on a fault severity, thereby helping properly use limited repair resources, to repair a relatively severe fault and improve utilization of memory fault repair resources.

Optionally, after the foregoing step S404, the method further includes: S405: the out-of-band controller sends a repair request to the CPU, where the repair request is used to request the CPU to perform fault repair on the target cache block.

The repair request carries mark information of the target replacement cache block.

Optionally, the mark information of the target replacement cache block is the foregoing reclaimable identifier.

Optionally, the repair request includes a fault occurrence location of the target cache block, and is used by the CPU to learn of and repair the fault.

It may be understood that the mark information of the target replacement cache block may be used by the CPU to perform the following operation: after receiving the repair request, when no idle repair resource exists, determining the target replacement cache block based on the mark information, and repairing the target cache block by using the target replacement cache block.

Figure 5:
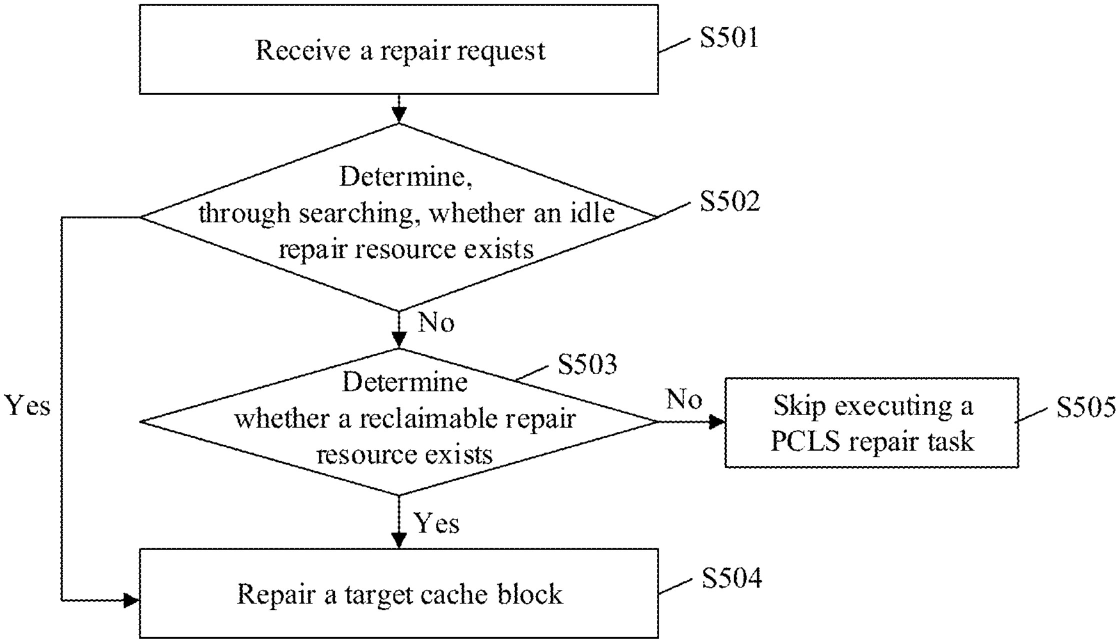
FIG. 5 is a schematic flowchart of a memory fault repair method according to an embodiment of this application.

Correspondingly, the CPU performs the repair process shown in FIG. 5, and the process includes:

S501: The CPU receives the repair request.

S502: The CPU searches whether an idle repair resource exists; and if yes, performs step S504; or if no, performs step S503.

S503: The CPU determines whether a reclaimable repair resource exists; and if yes, performs step S504; or if no, performs step S505, and does not execute a PCLS repair task.

It may be understood that the foregoing reclaimable repair resource is determined based on a result of comparison between the fault severities of the target cache block and the historically faulty cache block. When the condition in which the fault severity of the target cache block is greater than or equal to the fault severity of the historically faulty cache block is not met, the out-of-band controller does not determine the reclaimable repair resource. In this case, it indicates that the fault severity of the historically faulty cache block is higher, and the historically faulty cache block has a relatively high possibility of affecting the system. Correspondingly, the fault severity of the target cache block is lower. Therefore, PCLS repair may not be performed temporarily.

S504: The CPU repairs the target cache block.

Specifically, the CPU determines whether an idle replacement cache block exists. If an idle replacement cache block exists, the CPU repairs the target cache block by using the idle replacement cache block. If no idle replacement cache block exists, the CPU determines whether a reclaimable repair resource exists. If the reclaimable repair resource exists, the CPU repairs the target cache block by using a replacement cache block corresponding to the reclaimable repair resource. If no reclaimable repair resource exists, the CPU does not perform PCLS repair.

It may be understood that a repair manner in which the target cache block is replaced with the replacement cache block when the CPU fails to read data from or write data into a cache block in the memory because the cache block is faulty is specifically that a mapping relationship in which the CPU processes the target cache block is adjusted to a mapping relationship in which the CPU processes the replacement cache block, so that the CPU subsequently performs read/write on the replacement cache block, thereby repairing the memory fault. Specifically, the mapping relationship may be location information of a corresponding cache block from which the CPU reads data or into which the CPU writes data.

Optionally, after the foregoing fault repair is completed, the CPU feeds back a fault repair result to the out-of-band controller. The fault repair result includes a repair success or a repair failure.

It may be understood that, during the repair process in step S504, there is a repair failure possibility. The CPU feeds back the fault repair result to the out-of-band controller, so that the out-of-band controller learns of the fault repair result. The out-of-band controller updates a correspondence between a replacement cache block and a faulty cache block based on the fault repair result.

In a first possible implementation, the CPU repairs the target cache block by using an idle replacement cache block. In this case, when the fault repair result indicates a repair success, the out-of-band controller stores a correspondence between the target cache block and the replacement cache block that replaces the target cache block. The fault repair result may further include the foregoing fault information, such as the location information, the fault occurrence time, the fault severity and other information.

It may be understood that, when the out-of-band controller stores the foregoing correspondence for another subsequently faulty cache block, and a fault severity thereof is greater than the fault severity of the target cache block, the replacement cache block used to repair the target cache block may be used to repair the subsequently faulty cache block, that is, the correspondence is correspondingly modified.

In a second possible implementation, the CPU repairs the target cache block by using the target replacement cache block. In this case, when the fault repair result carries the mark information of the target replacement cache block, and indicates a repair success, the out-of-band controller updates a correspondence between the target replacement cache block and the historically faulty cache block to a correspondence between the target replacement cache block and the target cache block. The mark information of the target replacement cache block may be the foregoing reclaimable identifier.

It may be understood that, when the repair result carries the mark information of the target replacement cache block, it helps the out-of-band controller determine that a repair manner of the target cache block is to perform the repair by using the target replacement cache block. Correspondingly, in the first possible implementation, the out-of-band controller may send the mark information (for example, the reclaimable identifier) of the target replacement cache block to the CPU. However, because the CPU repairs the target cache block by using an idle repair resource, the repair result does not include the mark information of the target replacement cache block. Correspondingly, the correspondence between the target replacement cache block and the historically faulty cache block does not need to be modified.

In a third possible implementation, the CPU sends the fault repair result to the out-of-band controller, where the fault repair result includes indication information, and the indication information is used to indicate that an idle replacement cache block is used for repair or a reclaimable repair resource is used for repair.

It may be understood that, in this implementation, a specific repair manner is indicated to the out-of-band controller. This helps the out-of-band controller update a correspondence between a used replacement cache block and a faulty cache block based on the repair manner.

The foregoing three implementations help the out-of-band controller determine whether the target replacement cache block is used to repair the target cache block, and determine an update manner.

Optionally, when the fault repair result indicates a repair failure, the out-of-band controller does not store a correspondence between a new replacement cache block and the target cache block, or updates a correspondence between the target replacement cache block and the historically faulty cache block.

Optionally, after foregoing step S505, the fault repair result may be further sent by the CPU to the out-of-band controller to indicate that fault repair fails.

Figure 6:
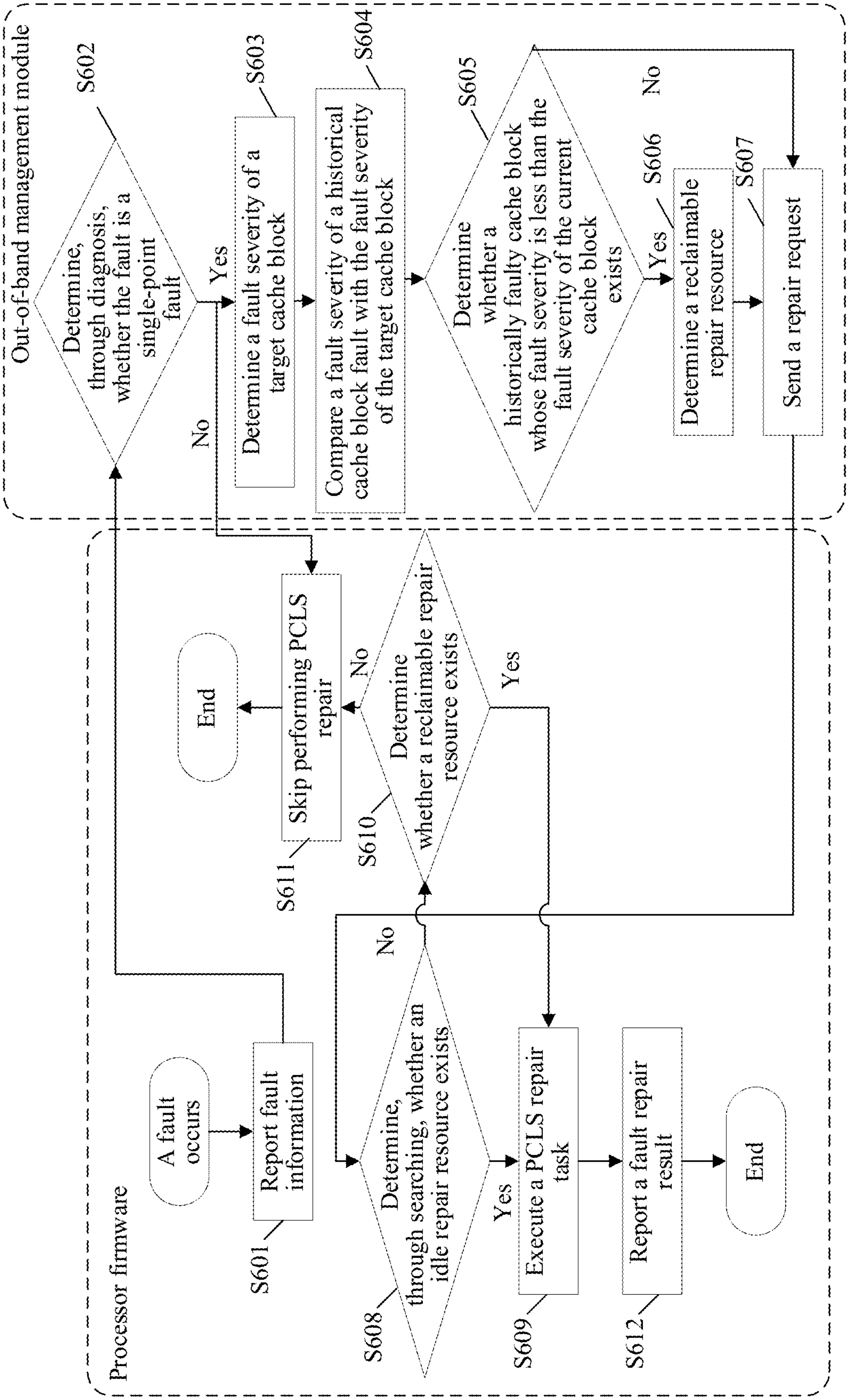
FIG. 6 is a schematic interaction diagram of a memory fault repair system according to an embodiment of this application.

The foregoing methods performed in FIG. 4 and FIG. 5 may be applied to a memory fault repair system shown in FIG. 6. The system includes at least an out-of-band controller and a CPU. Steps S601 to S612 are included.

S601: The processor reports fault information to the out-of-band controller.

Correspondingly, the out-of-band controller receives the fault information. This step is the same as the foregoing step S401.

S602: The out-of-band controller diagnose, whether it is a single-point fault.

This step is the same as the foregoing step S402.

S603: When the out-of-band controller determines that it is a single-point fault, determine a fault severity of a target cache block.

This step is the same as the foregoing step S403.

S604: The out-of-band controller compares a fault severity of a historically faulty cache block fault with the fault severity of the target cache block.

This step is the same as the foregoing step S404.

S605: The out-of-band controller determines whether a historically faulty cache block whose fault severity is less than the fault severity of the current cache block exists.

S606: When a historically faulty cache block whose fault severity is less than the fault severity of the target cache block exists, determine a reclaimable repair resource.

The reclaimable repair resource is the target replacement cache block described in foregoing step S404.

S607: The out-of-band controller sends a repair request to the CPU.

This step is the same as the foregoing step S405.

S608: The CPU searches based on the repair request, whether an idle repair resource exists.

This step is the same as the foregoing step S502.

S609: When an idle repair resource exists, execute a PCLS repair task.

This step is the same as the foregoing step S504.

S610: When no idle repair resource exists, determine whether a reclaimable repair resource exists.

This step is the same as the foregoing step S503.

When a reclaimable repair resource exists, the PCLS repair task is executed.

S611: When no reclaimable repair resource exists, skip executing the PCLS repair task.

S612: The CPU reports a fault repair result.

In the foregoing solution, the CPU is configured to perform repair action logic and reclaim action logic, and the out-of-band controller is configured to perform fault diagnosis logic and reclaim decision logic. The repair action logic is used to respond to the processing of a fault that occurs in hardware, and is responsible for reporting fault information to the fault diagnosis logic, and processing a fault repair task delivered by the fault diagnosis logic. The reclaim action logic is used to reclaim a specified repair resource and complete a subsequent repair task. The fault diagnosis logic is used to receive reported fault information and identify a fault feature. The reclaim decision logic is used to calculate a fault severity based on the fault feature, determine a reclaimable repair resource based on a sequence of fault severities, and deliver a fault repair task to the fault repair action logic.

In the memory fault system, the foregoing method is performed, so that the CPU and the out-of-band controller respectively perform fault diagnosis and fault repair, and determine an available resource for the target cache block from the replacement cache block occupied by the historically faulty cache block, to help perform repair based on the fault severity of the cache block, thereby helping properly utilize limited repair resources, to repair a relatively severe fault and improve utilization of a repair resource of a memory fault.

The foregoing mainly describes the solutions in embodiments of this application from the perspective of the method. It may be understood that, to implement the foregoing functions, the memory fault processing apparatus includes at least one of a corresponding hardware structure and a corresponding software module for performing various functions. A person of ordinary skill in the art should easily understand that, in combination with the examples described in the embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the memory fault processing apparatus may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in embodiments of this application, unit division is an example, and is merely logical function division. During actual implementation, another division manner may be used.

Figure 7:
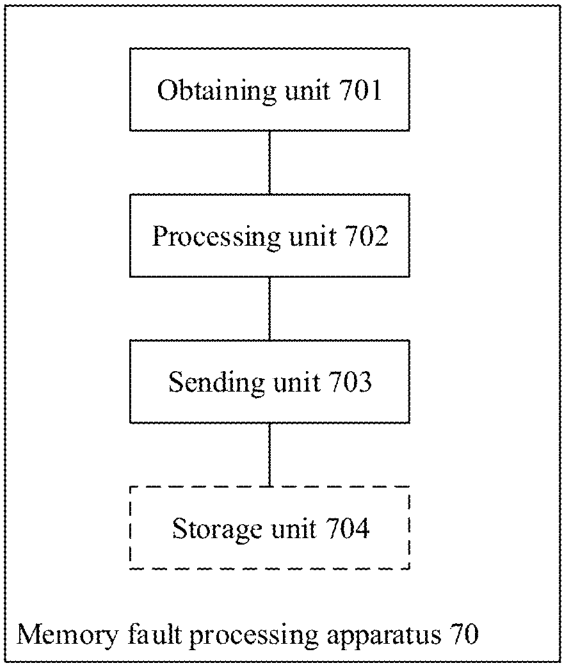
FIG. 7 is a schematic diagram of composition of a memory fault repair apparatus according to an embodiment of this application.

When each functional module is obtained through division based on each corresponding function, FIG. 7 is a schematic diagram of a possible structure of the memory fault processing apparatus in the foregoing embodiment. As shown in FIG. 7, the memory fault processing apparatus 70 includes an obtaining unit 701, a processing unit 702, and a sending unit 703. In some embodiments, the term "unit" refers to hardware components or hardware components configured with software functionalities.

The obtaining unit 701 is configured to obtain fault information of a memory, where the fault information indicates that at least one cache block is faulty.

The processing unit 702 is configured to determine a fault severity of a target cache block based on the fault information, where the target cache block is one of the at least one cache block.

The processing unit 702 is further configured to determine a target replacement cache block based on the fault severity of the target cache block, where the target replacement cache block is used to replace the target cache block, the target replacement cache block is a cache block that currently replaces a historically faulty cache block, and the fault severity of the target cache block is greater than or equal to a fault severity of the historically faulty cache block.

The sending unit 703 is configured to send a repair request to a central processing unit CPU, where the repair request is used to request the CPU to perform fault repair on the target cache block, and the repair request carries mark information of the target replacement cache block.

In an example, the processing unit 702 is configured to count a fault occurrence quantity of the target cache block within a preset time period, where the fault occurrence quantity is used to represent the fault severity of the target cache block, and the preset time period is a time period from the startup of a server in which the memory is located to a current moment.

In an example, the processing unit 702 is configured to input fault information of the target cache block into a fault model, and output the fault severity of the target cache block, where the fault model is used to determine a fault severity of a cache block based on fault information of the cache block in the memory.

In an example, the fault information includes the information about a location at which the at least one cache block is faulty, and the processing unit 702 is further configured to: determine a fault type of the at least one cache block based on the information about the location at which the at least one cache block is faulty; and determine that a cache block whose fault type is a single-point fault is the target cache block, where a row address of the target cache block is different from a row address of another faulty cache block, and a column address of the target cache block is different from a column address of the another faulty cache block.

In an example, the target replacement cache block is a cache block that currently replaces a historically faulty cache block with a lowest fault severity.

In an example, the obtaining unit 701 is further configured to receive a fault repair result that is of the target cache block and that is sent by the CPU. When the fault repair result indicates a repair success, the processing unit 702 is further configured to store a correspondence between the target cache block and a replacement cache block that replaces the target cache block. When the fault repair result carries the mark information of the target replacement cache block, and indicates a repair success, the processing unit is further configured to update a correspondence between the target replacement cache block and the historically faulty cache block to a correspondence between the target replacement cache block and the target cache block.

The content related to the steps in the foregoing method embodiments may be described in the function descriptions of corresponding functional modules, and details are not described herein again.

Certainly, the memory fault processing apparatus provided in this embodiment of this application includes but is not limited to the foregoing units. For example, the memory fault processing apparatus may further include a storage unit 704.

The storage unit 704 may be configured to store program code and data of the memory fault processing apparatus.

An embodiment of this application further provides a computer-readable storage medium. The computer-readable storage medium stores a computer program. When the computer program is run on a computer, the computer is enabled to perform the method performed by any computer device provided above.

For descriptions of related content and beneficial effects in any computer-readable storage medium provided above, refer to the foregoing corresponding embodiments. Details are not described herein again.

An embodiment of this application further provides a chip. A control circuit configured to implement functions of the foregoing memory fault processing apparatus and one or more ports are integrated into the chip. Optionally, for a function supported by the chip, refer to the foregoing descriptions. Details are not described herein again. A person of ordinary skill in the art may understand that all or some of the steps of the foregoing embodiments may be implemented by a program instructing relevant hardware. The program may be stored in a computer-readable storage medium. The storage medium mentioned above may be a read-only memory, a random access memory, or the like. The processing unit or the processor may be a central processing unit, a general-purpose processor, an application-specific integrated circuit (ASIC), a digital signal processor (DSP), a field programmable gate array (FPGA) or another programmable logic device, a transistor logic device, a hardware component, or any combination thereof.

An embodiment of this application further provides a computer program product that includes instructions. When the instructions are run on a computer, the computer is enabled to perform any method in the foregoing embodiments. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any available medium accessible by the computer or a data storage device that includes one or more available media, for example, a server or a data center. The usable medium may be a magnetic medium (for example, a floppy disk, a hard disk, or a magnetic tape), an optical medium (for example, a DVD), or a semiconductor medium (for example, an SSD).

It should be noted that the foregoing components that are provided in the embodiments of this application and that are configured to store computer instructions or a computer program include but are not limited to the foregoing storage, the computer-readable storage medium, and the communication chip, and can be non-transitory.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any available medium accessible by the computer or a data storage device that includes one or more available media, for example, a server or a data center. The usable medium may be a magnetic medium (for example, a floppy disk, a hard disk, or a magnetic tape), an optical medium (for example, a DVD), or a semiconductor medium (for example, a solid state disk (SSD)).

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, this specification and the accompanying drawings are merely example description of this application defined by the appended claims, and are considered as any of or all modifications, variations, combinations or equivalents that cover the scope of this application. Clearly, a person skilled in the art may make various modifications and variations to this application without departing from the spirit and scope of this application. In this way, if these modifications and variations in this application fall within the scope of the claims of this application and the equivalent technologies thereof, this application also intends to include these modifications and variations.

What is claimed is:

1. A memory fault processing method, wherein the method comprises:

obtaining, by an out-of-band controller, fault information of a memory, wherein the fault information indicates that at least one cache block is faulty;

determining a fault severity of a target cache block based on the fault information, wherein the target cache block is one of the at least one cache block;

determining a target replacement cache block based on a comparison of the fault severity of the target cache block and a fault severity of a historically faulty cache block of a plurality of historically faulty cache blocks, wherein the target replacement cache block is used to replace the target cache block, the target replacement cache block is a cache block that is currently used to replace the historically faulty cache block, and the fault severity of the target cache block is greater than or equal to the fault severity of the historically faulty cache block; and sending a repair request to a central processing unit (CPU), to request the CPU to perform fault repair on the target cache block, wherein the repair request carries mark information of the target replacement cache block.

2. The method according to claim 1, wherein the determining of the fault severity of the target cache block based on the fault information comprises:

counting a fault occurrence quantity of the target cache block within a preset time period, wherein the fault occurrence quantity represents the fault severity of the target cache block, and the preset time period is a time period from a start-up of a server in which the memory is located to a current moment.

3. The method according to claim 2, wherein the determining of the fault severity of the target cache block based on the fault information comprises:

inputting fault information of the target cache block into a fault model, and receiving the fault severity of the target cache block as an output of the fault model, wherein the fault information comprises at least one of location information, a fault occurrence time, and a fault occurrence quantity.

4. The method according to claim 3, wherein the historically faulty cache block has the lowest fault severity of the plurality of the historically faulty cache blocks.

5. The method according to claim 3, wherein the method further comprises:

receiving a fault repair result of the target cache block sent by the CPU;

when the fault repair result indicates a repair success, storing, by the out-of-band controller, a correspondence between the target cache block and a replacement cache block that replaces the target cache block; and when the fault repair result carries the mark information of the target replacement cache block, and indicates a repair success, updating, by the out-of-band controller, a correspondence between the target replacement cache block and the historically faulty cache block to a correspondence between the target replacement cache block and the target cache block.

6. The method according to claim 2, wherein the fault information comprises information about a location at which the at least one cache block is faulty, and before the determining of the fault severity of a target cache block based on the fault information, the method further comprises:

determining a fault type of the at least one cache block based on the information about the location at which the at least one cache block is faulty; and determining that a cache block whose fault type is a single-point fault is the target cache block, wherein a row address of the target cache block is different from a row address of another faulty cache block, and a column address of the target cache block is different from a column address of the other faulty cache block.

7. The method according to claim 2, wherein the historically faulty cache block has the lowest fault severity of the plurality of the historically faulty cache blocks.

8. The method according to claim 2, wherein the method further comprises:

receiving a fault repair result of the target cache block sent by the CPU;

when the fault repair result indicates a repair success, storing, by the out-of-band controller, a correspondence between the target cache block and a replacement cache block that replaces the target cache block; and when the fault repair result carries the mark information of the target replacement cache block, and indicates a repair success, updating, by the out-of-band controller, a correspondence between the target replacement cache block and the historically faulty cache block to a correspondence between the target replacement cache block and the target cache block.

9. The method according to claim 1, wherein the determining of the fault severity of the target cache block based on the fault information comprises:

inputting first fault information of the target cache block into a fault model, and receiving the fault severity of the target cache block as an output of the fault model, wherein the first fault information comprises at least one of location information, a fault occurrence time, or a fault occurrence quantity.

10. The method according to claim 9, wherein the historically faulty cache block has the lowest fault severity of the plurality of the historically faulty cache blocks.

11. The method according to claim 9, wherein the method further comprises:

receiving a fault repair result of the target cache block sent by the CPU;

when the fault repair result indicates a repair success, storing, by the out-of-band controller, a correspondence between the target cache block and a replacement cache block that replaces the target cache block; and when the fault repair result carries the mark information of the target replacement cache block, and indicates a repair success, updating, by the out-of-band controller, a correspondence between the target replacement cache block and the historically faulty cache block to a correspondence between the target replacement cache block and the target cache block.

12. The method according to claim 1, wherein the fault information comprises information about a location at which the at least one cache block is faulty, and before the determining of the fault severity of a target cache block based on the fault information, the method further comprises:

determining a fault type of the at least one cache block based on the information about the location at which the at least one cache block is faulty; and determining that a cache block whose fault type is a single-point fault is the target cache block, wherein a row address of the target cache block is different from a row address of another faulty cache block, and a column address of the target cache block is different from a column address of the other faulty cache block.

13. The method according to claim 12, wherein the method further comprises:

receiving a fault repair result of the target cache block sent by the CPU;

when the fault repair result indicates a repair success, storing, by the out-of-band controller, a correspondence between the target cache block and a replacement cache block that replaces the target cache block; and when the fault repair result carries the mark information of the target replacement cache block, and indicates a repair success, updating, by the out-of-band controller, a correspondence between the target replacement cache block and the historically faulty cache block to a correspondence between the target replacement cache block and the target cache block.

14. The method according to claim 1, wherein the historically faulty cache block has the lowest fault severity of the plurality of the historically faulty cache blocks.

15. The method according to claim 1, wherein the method further comprises:

receiving a fault repair result of the target cache block sent by the CPU;

when the fault repair result indicates a repair success, storing, by the out-of-band controller, a correspondence between the target cache block and a replacement cache block that replaces the target cache block; and when the fault repair result carries the mark information of the target replacement cache block, and indicates a repair success, updating, by the out-of-band controller, a correspondence between the target replacement cache block and the historically faulty cache block to a correspondence between the target replacement cache block and the target cache block.

16. A memory fault processing method, wherein the method comprises:

receiving, by a central processing unit (CPU), a repair request sent by an out-of-band controller, wherein the repair request requests to perform fault repair on a target cache block, the repair request carries mark information of a target replacement cache block, the target replacement cache block is a cache block that is currently used to replace a historically faulty cache block of a plurality of historically faulty cache blocks based on a comparison of a fault severity of the target cache block and a fault severity of the historically faulty cache block, and the fault severity of the target cache block is greater than or equal to the fault severity of the historically faulty cache block; and when an idle replacement cache block exists, replacing, by the CPU, the target cache block with the idle replacement cache block based on the repair request; or when no idle replacement cache block exists, replacing, by the CPU, the target cache block with the target replacement cache block based on the repair request.

17. The method according to claim 16, wherein the method further comprises:

sending, by the CPU, a fault repair result of the target cache block to the out-of-band controller; and when the target cache block is replaced with the idle replacement cache block, and repair succeeds, sending information about the target cache block and the idle replacement cache block to the out-of-band controller; or when the target cache block is replaced with the target replacement cache block, and repair succeeds, sending the mark information of the target replacement cache block to the out-of-band controller.

18. A memory fault processing apparatus, comprising a storage and at least one processor, wherein the storage is configured to store program code, and the at least one processor is configured to invoke the program code to cause the apparatus to:

obtain, by an out-of-band controller, fault information of a memory, wherein the fault information indicates that at least one cache block is faulty;

determine a fault severity of a target cache block based on the fault information, wherein the target cache block is one of the at least one cache block;

determine a target replacement cache block based on a comparison of the fault severity of the target cache block and a fault severity of a historically faulty cache block of a plurality of historically faulty cache blocks, wherein the target replacement cache block is used to replace the target cache block, the target replacement cache block is a cache block that is currently used to replace the historically faulty cache block, and the fault severity of the target cache block is greater than or equal to the fault severity of the historically faulty cache block; and send a repair request to the at least one processor, to request the at least one processor to perform fault repair on the target cache block, wherein the repair request carries mark information of the target replacement cache block.

19. The apparatus according to claim 18, wherein the historically faulty cache block has the lowest fault severity of the plurality of the historically faulty cache blocks.

20. The apparatus according to claim 18, wherein the apparatus is further caused to perform:

obtaining a fault repair result of the target cache block and when the fault repair result indicates a repair success, storing, by the out-of-band controller, a correspondence between the target cache block and a replacement cache block that replaces the target cache block.

* * * * *